Feb. 5, 1924.                                          1,482,821
                        E. SIXT
                      COLLAR PIN
                  Filed July 27, 1923
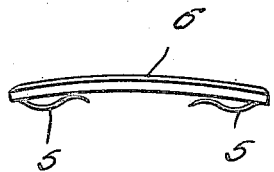
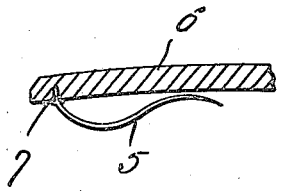
Eugene Sixt,
Inventor
Witnesses:
By Clarence A. O'Brien
Attorney Patented Feb. 5, 1924.

1,482,821

UNITED STATES PATENT OFFICE.

EUGENE SIXT, OF SPRINGVILLE, NEW YORK.

COLLAR PIN.

Application filed July 27, 1923. Serial No. 654,110.

*To all whom it may concern:*

Be it known that EUGENE SIXT, citizen of the United States, residing at Springville, in the county of Erie and State of New York, has invented certain new and useful Improvements in Collar Pins, of which the following is a specification.

This invention relates to an improved form of pin fastener particularly adapted to hold the points of a soft collar together for preserving a neat appearance of the collar on the wearer.

Objects of the invention are to provide a device of the above kind which is extremely simple in construction, readily attachable to the collar, and one which is effectively held against accidental loss.

Other objects will appear as the nature of the invention is better understood, and the same consists in the novel form, combination and arrangement of parts hereinafter more fully described, shown in the accompanying drawing, and claimed.

In the drawing, wherein like reference characters indicate corresponding parts throughout the several views, Figure 1 is a front elevational view of a collar pin constructed in accordance with the present invention, Figure 2 is a side elevational view of the device shown in Figure 1, and Figure 3 is an enlarged fragmentary sectional view of the pin.

Referring in detail to the drawing, the invention embodies two small pins 5 which are fixed to the ends of a slightly curved bar 6 upon the rear of the latter, said bar being provided upon its front surface with any suitable ornamentation.

The pins 5 are of S-shape and have their outer ends rigidly attached to the bar preferably by drilling small holes in each end of the bar and inserting and soldering the pins therein as indicated at 7 in Figure 3. When thus positioned, the free outturned end portions of the pin are in close proximity to the rear surface of the bar 6, said pins being in spaced relation as shown in Figure 2.

A collar pin constructed in accordance with the present invention will be found very convenient and serviceable. It is attached to the collar by hooking one end of the pin in the collar point and drawing the other point of the collar snugly and inserting the other end of the pin. To remove the pin, the collar is held at the points of the same, and one end of the pin is unhooked, whereupon the other end of the pin may be unhooked.

It will thus be seen that a very simple collar fastener is provided which may be more readily attached than the pins now in use, and by reason of the S-shape of the pin members, the device will stay in place.

What I claim as new is:

A pin fastener for holding the points of a soft collar in adjacent relation comprising a slightly curved bar having spaced S-shaped pins rigidly fastened to the ends thereof, the free ends of the pins projecting inwardly towards each other with the free end portions of the same in close proximity to the rear surface of said bar, said pin members being provided with end portions inserted in sockets in the end of the bar and soldered therein.

In testimony whereof I affix my signature.

EUGENE SIXT.